(No Model.)
N. D. PENOYER.
VEHICLE WHEEL.
No. 523,051. Patented July 17, 1894.
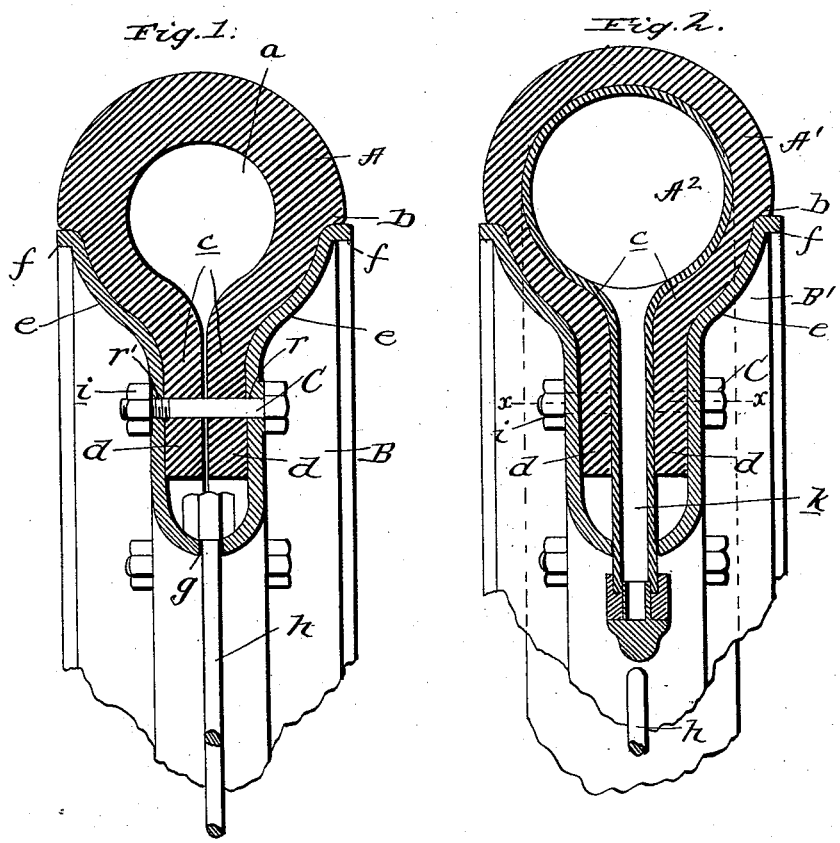
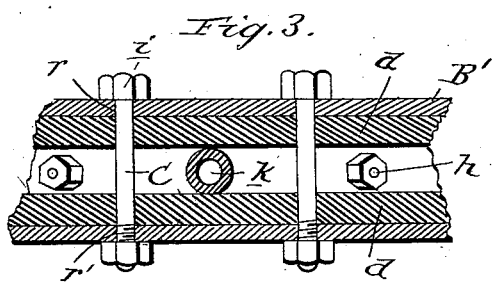
Witnesses:
Inventor
Newton D. Penoyer
By James J. Sheehy
Attorney

UNITED STATES PATENT OFFICE.

NEWTON D. PENOYER, OF FORT WORTH, TEXAS.

VEHICLE-WHEEL.

SPECIFICATION forming part of Letters Patent No. 523,051, dated July 17, 1894.

Application filed December 4, 1893. Serial No. 492,734. (No model.)

*To all whom it may concern:*

Be it known that I, NEWTON D. PENOYER, a citizen of the United States, residing at Fort Worth, in the county of Tarrant and State of Texas, have invented certain new and useful Improvements in Vehicle-Wheels; and I do declare the following to be a full, clear, and exact description of the invention, such as will enable others skilled in the art to which it appertains to make and use the same.

My invention relates to improvements in that class of vehicle wheels which are provided with cushion, pneumatic, or other elastic tires; and its novelty will be fully understood from the following description and claim when taken in connection with the annexed drawings, in which—

Figure 1, is a detail section of a cushion tire and a felly embodying my invention. Fig. 2, is a similar view of a pneumatic tire and the felly, and Fig. 3, is a section taken in the plane indicated by the line $x, x$, of Fig. 2.

Referring by letter to said drawings and more particularly to Fig. 1, thereof:—A, indicates my improved cushion tire; and B, indicates the felly which is formed of steel or equivalent material and is designed to receive and securely hold the tire, as will be presently described. The tire A, may be and preferably is formed by pouring molten rubber into a suitable mold, and it comprises the circular and hollow body portion $a$, having shoulders as $b$, designed to rest against the edges of the felly, and the inwardly extending branch $c$, formed by the parallel free portions $d$, of the piece of rubber or other suitable material which branches $c$, are designed to rest in and be clamped and held by the felly B, as shown.

The felly B, is of a general V-shape in cross-section as better shown in Fig. 1, and it has the free portions of its side walls flared outwardly and curved as shown at $e$, so as to conform to the circular body of the tire, and also has its edges flanged as shown at $f$, so as to prevent them from cutting or otherwise damaging the tire. Said felly B, may be and preferably is formed by bending a piece of steel or other suitable metal into the shape shown, and it is provided in its bottom or inner side with openings $g$, to receive the spokes $h$, of the wheels, and is also provided with the transverse apertures $r, r'$, to receive the clamping bolts C, which take through the branch $c$, of the tire and serve to clamp the felly against the same so as to securely hold it against casual disconnection or displacement. These clamping bolts C, are headed at one end as shown, and they have their opposite ends threaded to engage the threads of the apertures $r'$, and to receive the nuts $i$, which serve to fix the bolts in position.

By reason of the construction described it will be perceived that the tire is securely connected to the felly, and there is absolutely no danger of the tire being displaced or disconnected in making a sharp turn as it is apt to do when connected to the felly by cement, glue, or other adhesive substance. It will also be seen that my improved construction is very light and cheap and that the tire may be readily placed and secured in position and as readily disconnected from the felly when desired.

In Figs. 2, and 3, of the drawings, I have shown an inflatable or pneumatic tire embodying my invention. In this construction, I employ an outer protective cover A', of rubber or other suitable material which is similar in general form to the cushion tire A, and is secured in the felly B', in substantially the same manner that the said tire A, is secured in the felly B, and an inflatable tube A², which is arranged within the covering A', and is provided with a filling conduit $k$, which extends inwardly between the portion $d$, of the covering and through the felly as shown. The felly B', in this modified construction is of substantially the same form and construction as the felly A, but is preferably of a greater width as shown so as to permit the conduit $k$, to rest between the portions $d$, as shown.

As is obvious my improved wheel is designed more especially for use in bicycles and other velocipedes, but I do not desire to be confined to such use as the wheel might be employed upon any vehicle to which it is applicable.

I am well aware that it is old to provide a rubber tire with two inwardly extended branches and clamp the said branches in a felly comprising two separate plates and bolts connecting the said plates. I am also aware that it is old to provide a metallic felly of general U-shape in cross-section to receive an elastic tire, and I make no claim to such constructions broadly.

I claim—

The herein described vehicle wheel consisting essentially of the following elements in combination, viz: the elastic tire A, having shoulders as b, and the inwardly extending parallel branches c, the felly B, formed by a single piece of metal bent into U-shape and adapted to receive the branches c, and having its side walls flared outwardly and curved to seat the body portion of the tire and also having its edges flanged to engage the shoulders b, of the tire, the transverse bolts taking through the side walls of the felly and the branches c, of the tire, and adapted to clamp or bind the felly against the tire, and the spokes let into the inner portion of the felly, all substantially as and for the purpose set forth.

In testimony whereof I affix my signature in presence of two witnesses.

NEWTON D. PENOYER.

Witnesses:
E. A. CALDWELL,
A. B. LOPP.